(12) United States Patent
Park et al.

(10) Patent No.: US 11,338,758 B2
(45) Date of Patent: May 24, 2022

(54) ROOFTOP AIRBAG APPARATUS

(71) Applicant: HYUNDAI MOBIS CO., LTD., Seoul (KR)

(72) Inventors: Hae Kwon Park, Yongin-si (KR); Seok Hoon Ko, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 101 days.

(21) Appl. No.: 16/427,755

(22) Filed: May 31, 2019

(65) Prior Publication Data

US 2019/0366968 A1 Dec. 5, 2019

(30) Foreign Application Priority Data

Jun. 5, 2018 (KR) .................. 10-2018-0065004

(51) Int. Cl.
*B60R 21/232* (2011.01)
*B60R 21/2338* (2011.01)
*B60R 21/214* (2011.01)
*B60R 21/231* (2011.01)

(52) U.S. Cl.
CPC .......... *B60R 21/232* (2013.01); *B60R 21/214* (2013.01); *B60R 21/2338* (2013.01); *B60R 2021/23153* (2013.01); *B60R 2021/23161* (2013.01); *B60R 2021/23192* (2013.01)

(58) Field of Classification Search
CPC ........ B60R 21/214; B60R 2021/23192; B60R 2021/23161; B60R 2021/23153
See application file for complete search history.

(56) References Cited

U.S. PATENT DOCUMENTS

| | | | |
|---|---|---|---|
| 9,016,717 B1 * | 4/2015 | Clauser | B60R 21/233 280/729 |
| 2017/0113646 A1 * | 4/2017 | Lee | B60R 21/2338 |
| 2018/0229681 A1 * | 8/2018 | Jaradi | B60R 21/237 |
| 2019/0375363 A1 * | 12/2019 | Abe | B60R 21/214 |
| 2019/0381968 A1 * | 12/2019 | Kwon | B60R 21/239 |
| 2020/0223387 A1 * | 7/2020 | Min | B60R 21/2338 |

FOREIGN PATENT DOCUMENTS

WO    WO-2019209442 A1 * 10/2019 ........... B60R 21/214

* cited by examiner

*Primary Examiner* — Jonathan Ng
*Assistant Examiner* — Mary E Young
(74) *Attorney, Agent, or Firm* — DLA Piper LLP (US)

(57) ABSTRACT

A rooftop airbag apparatus may include: a rear cushion installed above a rear seat, connected to a rear inflator, and expanded and deployed as gas is injected from the rear inflator; and a rear tether connected to the rear cushion to bend a front side of the rear cushion downward when the rear cushion is deployed.

15 Claims, 6 Drawing Sheets

ROOFTOP AIRBAG APPARATUS

CROSS-REFERENCES TO RELATED APPLICATIONS

The present application claims priority to Korean application number 10-2018-0065004, filed on Jun. 5, 2018, which is incorporated by reference in its entirety.

BACKGROUND OF THE INVENTION

The present invention relates to a rooftop airbag apparatus, and more particularly, to a rooftop airbag apparatus which can prevent a collision between passengers and protect the heads of the passengers, even though the direction in which the passengers are seated is changed.

In general, a vehicle has a rooftop window installed at the roof thereof. A rooftop airbag is installed on one side of the rooftop window so as to cover the rooftop window. At this time, the rooftop airbag covers the tops of front and rear seats. In case of a collision of the vehicle, the rooftop airbag is deployed as gas is injected into the rooftop airbag. The rooftop airbag prevents a passenger from being thrown out of the vehicle and protects the passenger, in case of a rollover (overturn) of the vehicle.

However, since the conventional rooftop airbag is evenly deployed to cover the rooftop window, the rooftop airbag cannot protect the head of the passenger when the head of the passenger moves forward. Furthermore, when a passenger in the front seat and a passenger in the rear seat are seated facing each other, the heads of the passengers may collide with each other in case of a vehicle collision. Therefore, when the passengers are seated facing each other, the possibility that the passengers will get injured may increase. Therefore, there is a demand for a device capable of solving the problem.

SUMMARY OF THE INVENTION

Embodiments of the present invention are directed to a rooftop airbag apparatus which can prevent a collision between passengers and protect the heads of the passengers, even though the direction in which the passengers are seated is changed.

In one embodiment, a rooftop airbag apparatus may include: a rear cushion installed above a rear seat, connected to a rear inflator, and expanded and deployed as gas is injected from the rear inflator; and a rear tether connected to the rear cushion to bend a front side of the rear cushion downward when the rear cushion is deployed.

The rear cushion may include: a first rear cushion part disposed to cover the top of the rear seat; and a second rear cushion part pulled by the rear tether so as to be bent downward from a leading end of the first rear cushion part.

Both ends of the rear tether may be connected to the first and second rear cushion parts, respectively.

The rear tether may be connected to both sides of the first and second rear cushion parts in a width direction.

A plurality of rear inactive areas may be formed between the first and second rear cushion parts.

The plurality of rear inactive areas may be formed in the width direction of the rear cushion, and a rear passage may be formed between the rear inactive areas such that gas passes through the rear passage.

The rooftop airbag apparatus may further include: a front cushion installed above a front seat, connected to a front inflator, and expanded and deployed as gas is injected from the front inflator; and a front tether connected to the front cushion to bend a front side of the front cushion downward when the front cushion is deployed.

The front cushion may include: a first front cushion part disposed to cover the top of the front seat; and a second front cushion part pulled by the front tether so as to be bent downward from a leading end of the first front cushion part.

Both ends of the front tether may be connected to the first and second front cushion parts, respectively.

The front tether may be connected to both sides of the first and second front cushion parts in a width direction.

A plurality of front inactive areas may be formed between the first and second front cushion parts.

The plurality of front inactive areas may be formed in the width direction of the front cushion, and a front passage may be formed between the front inactive areas such that gas passes through the front passage.

In accordance with the embodiment of the present invention, when the rear cushion is deployed, the front side of the rear cushion may be pulled by the rear tether and thus bent downward. Therefore, in case of a collision of the vehicle, the head of the passenger seated in the rear seat may be buffered by the bent portion of the rear cushion.

Furthermore, when the passenger in the front seat and the passenger in rear seat are seated facing each other, the bent portion of the rear cushion may protrude downward between the front seat and the rear seat. Therefore, the bent portion of the rear cushion may prevent a collision between the heads of the passengers seated in the front and rear seat. Furthermore, in case of a rollover of the vehicle, the rear cushion may prevent the passenger from being thrown out of the vehicle.

Moreover, when the front cushion is deployed, the front side of the front cushion may be pulled by the front tether and thus bent downward. Therefore, in case of a collision of the vehicle, the head of the passenger seated in the front seat may be buffered by the bent portion of the front cushion. Furthermore, in case of a rollover of the vehicle the front cushion may prevent the passenger seated in the front cushion from being thrown out of the vehicle.

Furthermore, since the front cushion protects the head of the passenger seated in the front seat, the installation of a driver seat airbag and a passenger seat airbag may be omitted, or the sizes of the driver seat airbag and the passenger seat airbag may be reduced. Thus, the weight of the vehicle can be reduced, and the assembly process of the vehicle can be simplified.

DESCRIPTION OF SPECIFIC EMBODIMENTS

Hereafter, a rooftop airbag apparatus in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
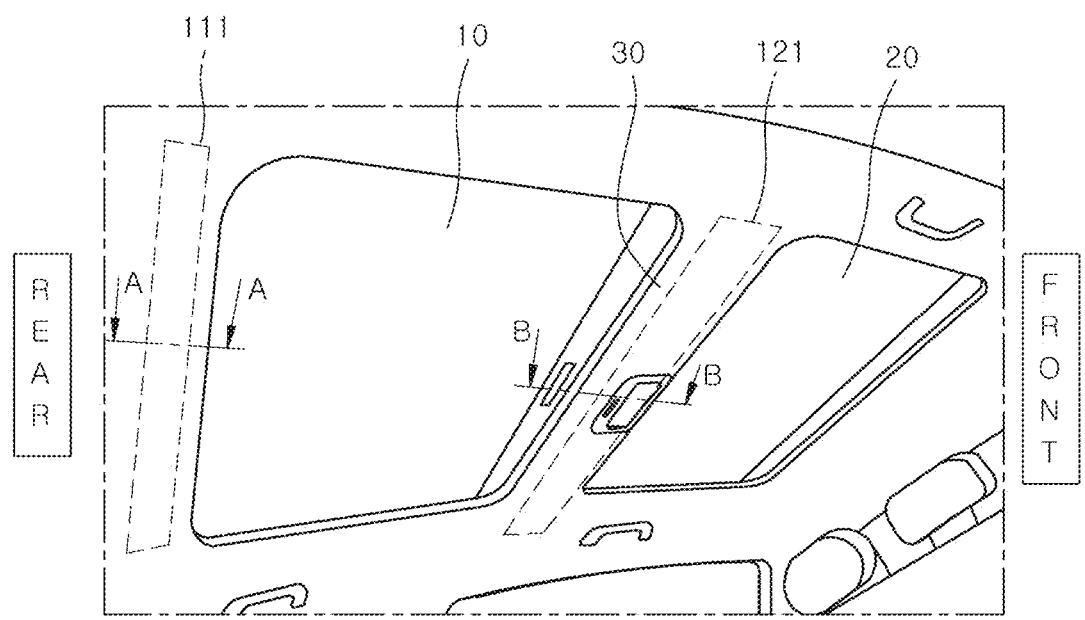
FIG. 1 is a diagram illustrating an installation position of a rooftop airbag apparatus in accordance with an embodiment of the present invention.
Figure 2:
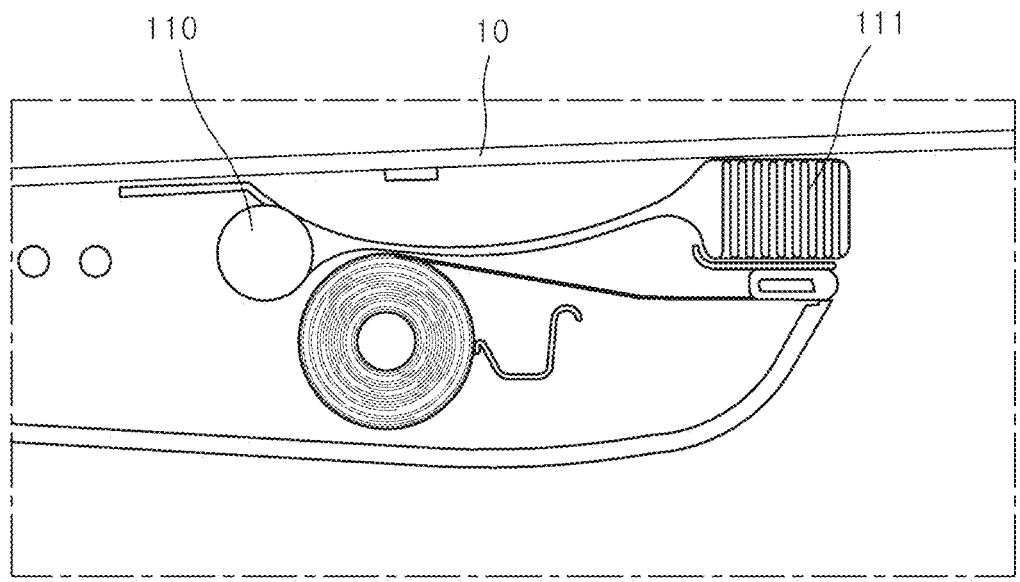
FIG. 2 illustrates that a rear cushion of the rooftop airbag apparatus in accordance with the embodiment of the present invention is installed.
Figure 3:
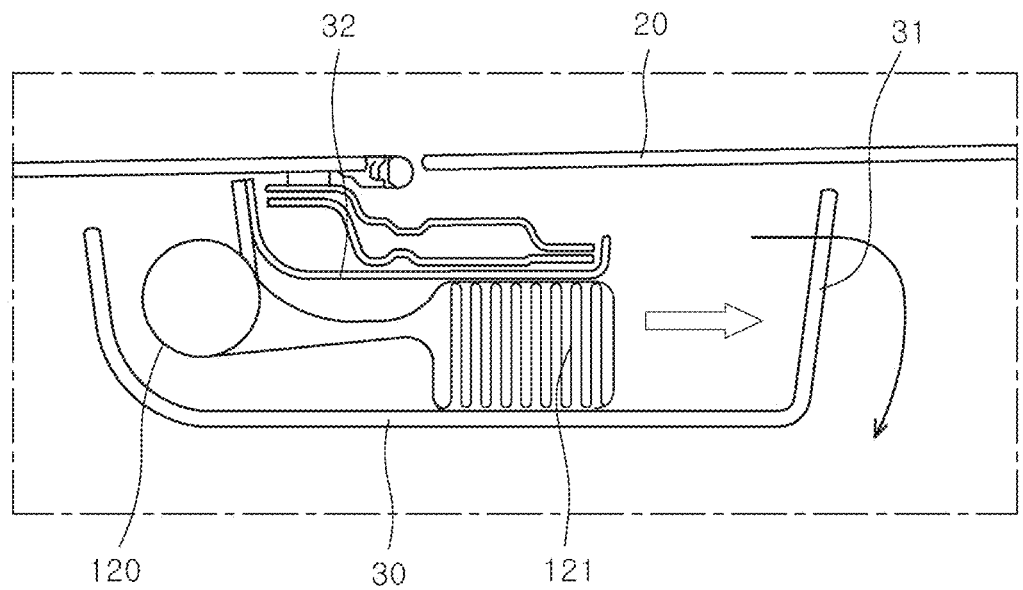
FIG. 3 illustrates that a front cushion of the rooftop airbag apparatus in accordance with the embodiment of the present invention is installed.
Figure 4:
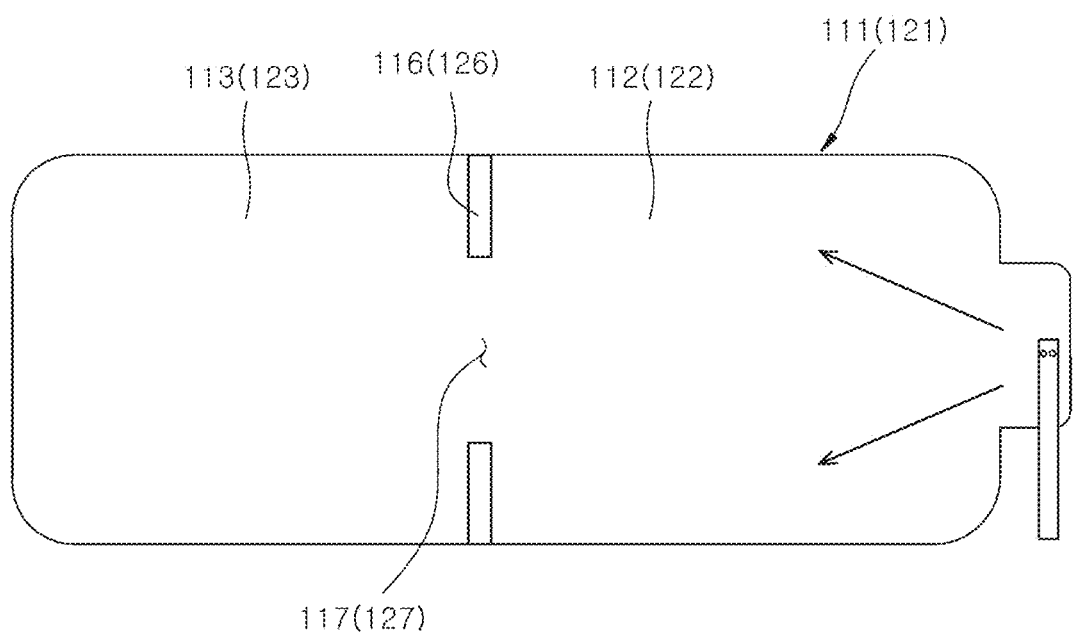
FIG. 4 illustrates that the rear and front cushions of the rooftop airbag apparatus in accordance with the embodiment of the present invention are unfolded.
Figure 5:
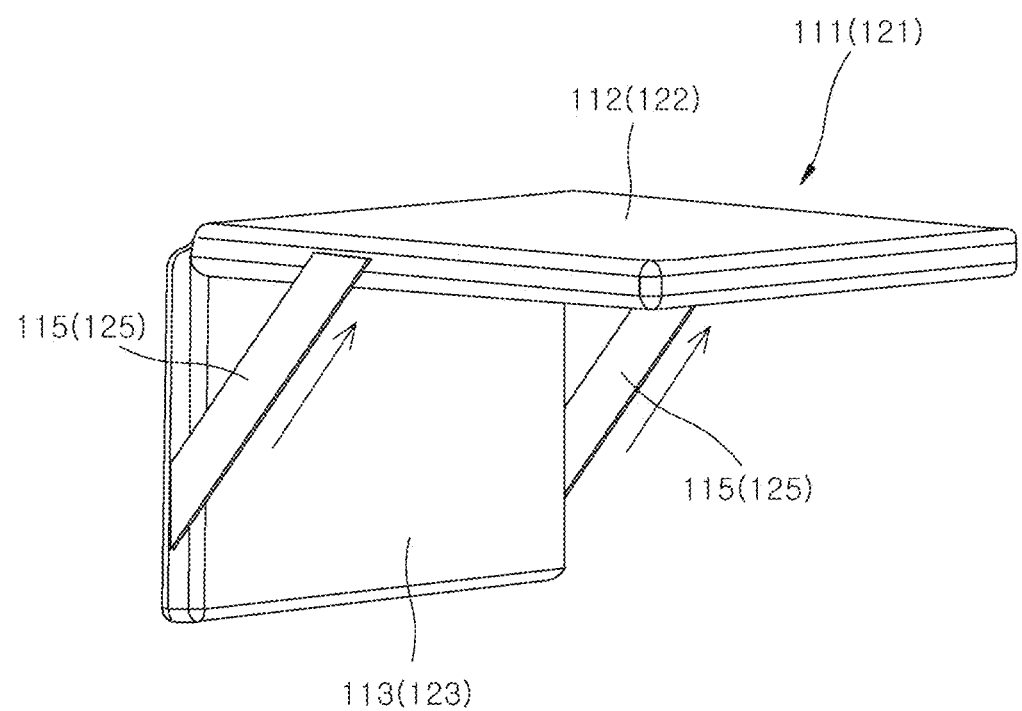
FIG. 5 illustrates that the rear and front cushions of the rooftop airbag apparatus in accordance with the embodiment of the present invention are expanded.
Figure 6:
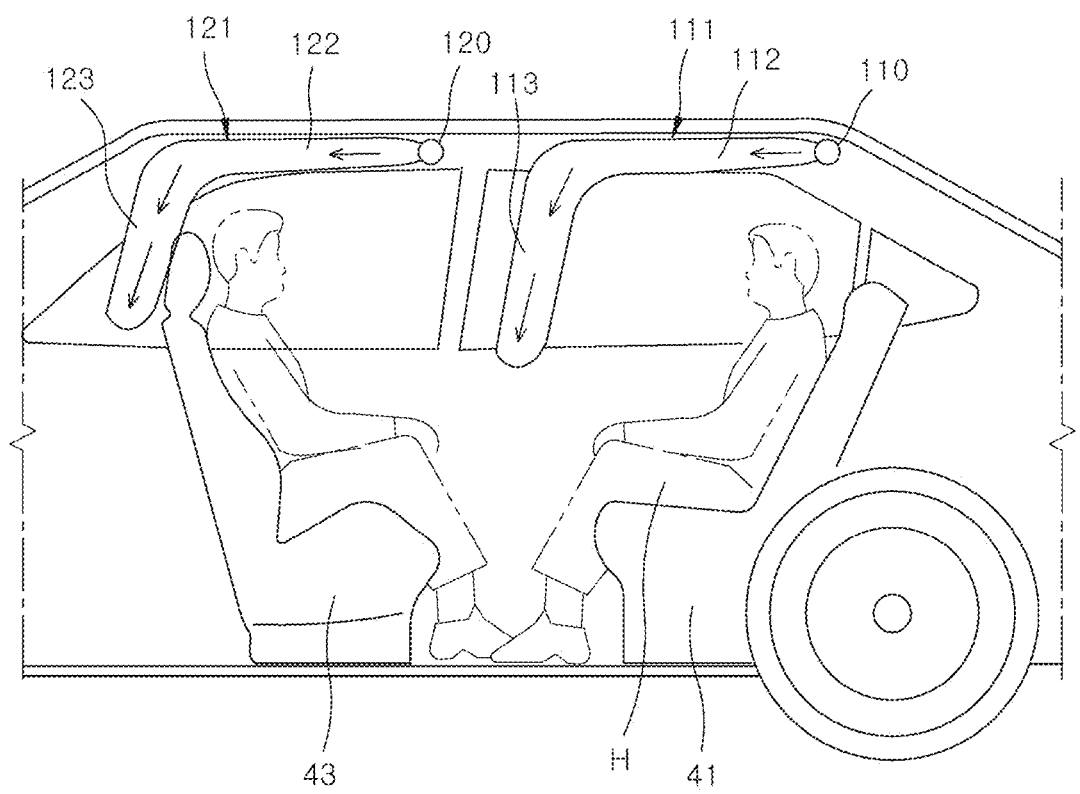
FIG. 6 illustrates that passengers are seated in front and rear seats to face each other in the rooftop airbag apparatus in accordance with the embodiment of the present invention.

FIG. 1 is a diagram illustrating an installation position of a rooftop airbag apparatus in accordance with an embodiment of the present invention, FIG. 2 illustrates that a rear cushion of the rooftop airbag apparatus in accordance with the embodiment of the present invention is installed, FIG. 3 illustrates that a front cushion of the rooftop airbag apparatus in accordance with the embodiment of the present invention is installed, FIG. 4 illustrates that the rear and front cushions of the rooftop airbag apparatus in accordance with the embodiment of the present invention are unfolded, FIG. 5 illustrates that the rear and front cushions of the rooftop airbag apparatus in accordance with the embodiment of the present invention are expanded, and FIG. 6 illustrates that passengers are seated in front and rear seats to face each other in the rooftop airbag apparatus in accordance with the embodiment of the present invention.

Referring to FIGS. 1 to 6, the rooftop airbag apparatus in accordance with the embodiment of the present invention may include a rear cushion 111 and a rear tether 115.

The rear cushion 111 may be installed above rear seats 41, connected to a rear inflator 110, and expanded and deployed as gas is injected by the rear inflator 110. The rear cushion 111 may be formed in a rectangular shape.

A vehicle may have front and rear seats 43 and 41 installed therein. A front rooftop window 20 may be installed above the front seat 43, and a rear rooftop window 10 may be installed above the rear seat 41. Between the front rooftop window 20 and the rear rooftop window 10, a center bar 30 may be disposed in the width direction of the vehicle. The rear cushion 111 may be folded and installed at the rear of the rear rooftop window 10, and the front cushion 121 may be folded and installed in the center bar 30. A vehicle body frame 32 may be installed at the top of the center bar 30. The center bar 30 may have a cover 31 installed at the front thereof, the cover 31 being opened when the front cushion 121 is expanded. The rear cushion 111 may be deployed along a rear guide (not illustrated), and the front cushion 121 may be deployed along a front guide (not illustrated).

The rear tether 115 may be connected to the rear cushion 111 such that the front side of the rear cushion 111 is bent downward when the rear cushion 111 is deployed. For example, one side of the rear tether 115 may be connected to one side (front side) of the rear cushion 111, and the other side of the rear tether 115 may be connected to the other side (rear side) of the rear cushion 111. Furthermore, the one side of the rear tether 115 may be connected to the one side (front side) of the rear cushion 111, and the other side of the rear tether 115 may be connected to the vehicle body.

As the front side of the rear cushion 111 is pulled by the rear tether 115, the front side of the rear cushion 111 may be bent downward. Thus, in case of a head-on collision of the vehicle, the head of the passenger H seated in the rear seat 41 may be buffered by the bent portion of the rear cushion 111. Furthermore, when the passenger H of the front seat 43 is seated facing the passenger of the rear seat 41, the bent portion of the rear cushion 111 may prevent a collision between the heads of the passengers H seated in the front seat 43 and the rear seat 41. Furthermore, in case of a rollover of the vehicle, the rear cushion 111 may cover the rear rooftop window 10 to prevent the passenger H from being thrown out of the vehicle.

The rear cushion 111 may include a first rear cushion part 112 disposed to cover the top of the rear seat 41 and a second rear cushion part 113 pulled by the rear tether 115 so as to be bent downward from the leading end of the first rear cushion part 112. Both ends of the rear tether 115 may be connected to the first and second rear cushion parts 112 and 113, respectively. At this time, both ends of the rear tether 115 may be connected to the first and second rear cushion parts 112 and 113, respectively, by a tether stitched part (not illustrated).

Therefore, when the rear cushion 111 is deployed, the first rear cushion part 112 may cover the top of the rear seat 41, i.e. the rear rooftop window 10, and the second rear cushion part 113 may be pulled by the rear tether 115 and erected downward. In case of a head-on collision of the vehicle, the head of the passenger H seated in the rear seat 41 may be buffered by the second rear cushion part 113. In addition, when the passenger H of the front seat 43 is seated facing the passenger of the rear seat 41, the second rear cushion part 113 may prevent a collision between the heads of the passengers H seated in the front seat 43 and the rear seat 41. Furthermore, in case of a rollover of the vehicle, the first rear cushion part 112 may cover the rear rooftop window 10 to prevent the passenger H from being thrown out of the vehicle.

When the rear cushion 111 is deployed, the second rear cushion part 113 may be disposed perpendicular or substantially perpendicular to the first rear cushion part 112. At this time, the angle between the first and second rear cushion parts 112 and 113 may be changed according to the connection positions of both ends of the rear tether 115 and the length of the rear tether 15.

The rear tether 115 may be connected to both sides of the first and second rear cushion parts 112 and 113 in the width direction. Therefore, although the rear tether 115 is tightly pulled when the rear cushion 111 is deployed, the head of the passenger in the rear seat 41 may be prevented from being caught in or interfering with the rear tether 115.

Between the first and second rear cushion parts 112 and 113, a rear inactive area 116 may be formed. The rear inactive area 116 is where a pair of overlapping fabrics are attached to each other and thus not separated from each other even though gas is supplied into the rear cushion 111. The rear inactive area 116 may be formed by attaching the overlapping fabrics through an adhesive or an inactive stitched part. Since the rear inactive area 116 is formed between the first and second rear cushion parts 112 and 113, the second rear cushion part 113 may be more easily bent downward when the rear cushion 111 is deployed.

In an embodiment, a plurality of rear inactive areas 116 may be formed in the width direction of the rear cushion 111, and a rear passage 117 may be formed between the rear inactive areas 116 such that gas is transferred through the rear passage 117. For example, two or more rear inactive areas 116 may be formed in the width direction of the rear cushion 111, and a plurality of rear passages 117 may be formed between the rear inactive areas 116. Therefore, gas of the first rear cushion part 112 may be supplied to the second rear cushion part 113 through the rear passages 117.

The rooftop airbag apparatus may further include a front cushion 121 and a front tether 125.

The front cushion 121 may be installed above front seats 43, connected to a front inflator 120, and expanded and deployed as gas is injected by the front inflator 120. The front cushion 121 may have a rectangular shape when deployed.

The front tether 125 may be connected to the front cushion 121 such that the front side of the front cushion 121 is bent downward when the front cushion 121 is deployed. For example, one side of the front tether 125 may be connected to one side (front side) of the front cushion 121, and the other side of the front tether 125 may be connected to the other side (rear side) of the front cushion 121. Furthermore, the one side of the front tether 125 may be connected to the one side (front side) of the front cushion 121, and the other side of the front tether 125 may be connected to the vehicle body.

As the front side of the front cushion 121 is pulled by the front tether 125, the front side of the front cushion 121 may be bent downward. Thus, in case of a head-on collision of the vehicle, the head of the passenger H seated in the front seat 43 may be buffered by the bent portion of the front cushion 121. Furthermore, in case of a rollover of the vehicle, the front cushion 121 may cover the front rooftop window 20 to prevent the passenger H seated in the front seat 43 from being thrown out of the vehicle.

The front cushion 121 may include a first front cushion part 122 disposed to cover the top of the front seat 43 and a second front cushion part 123 pulled by the front tether 125 so as to be bent downward from the leading end of the first front cushion part 122. Both ends of the front tether 125 may be connected to the first and second front cushion parts 122 and 123, respectively. At this time, both ends of the front tether 125 may be connected to the first and second front cushion parts 122 and 123, respectively, by a tether stitched part (not illustrated).

Therefore, when the front cushion 121 is deployed, the first front cushion part 122 may cover the top of the front seat 43, i.e. the front rooftop window 20, and the second front cushion part 123 may be pulled by the front tether 125 and thus erected downward. In case of a head-on collision of the vehicle, the head of the passenger H seated in the front seat 43 may be buffered by the second front cushion part 123. Furthermore, in case of a rollover of the vehicle, the first front cushion part 122 may cover the front rooftop window 20 to prevent the passenger H of the front seat 43 from being thrown out of the vehicle.

When the front cushion 121 is deployed, the second front cushion part 123 may be disposed perpendicular or substantially perpendicular to the first front cushion part 122. At this time, the angle between the first and second front cushion parts 122 and 123 may be changed according to the connection positions of both ends of the front tether 125 and the length of the front tether 125.

The front tether 125 may be connected to both sides of the first and second front cushion parts 122 and 123 in the width direction. Therefore, although the front tether 125 is tightly pulled when the front cushion 121 is deployed, the head of the passenger H in the front seat 43 may be prevented from being caught in or interfering with the front tether 125.

Between the first and second front cushion parts 122 and 123, a front inactive area 126 may be formed. The front inactive area 126 is where a pair of overlapping fabrics are attached to each other and thus not separated from each other even though gas is supplied into the front cushion 121. The front inactive area 126 may be formed by attaching the overlapping fabrics through an adhesive or a front inactive stitched part. Since the front inactive area 126 is formed between the first and second front cushion parts 122 and 123, the second front cushion part 123 may be more easily bent downward when the front cushion 121 is deployed.

In an embodiment, a plurality of front inactive areas 126 may be formed in the width direction of the front cushion 121, and a front passage 127 may be formed between the front inactive areas 126 such that gas is transferred through the front passage 127. For example, two or more front inactive areas 126 may be formed in the width direction of the front cushion 121, and a plurality of front passages 127 may be formed between the front inactive areas 126. Therefore, gas of the first front cushion part 122 may be supplied to the second front cushion part 123 through the front passage 127.

The operation of the rooftop airbag apparatus in accordance with the embodiment of the present invention will be described.

Figure 7:
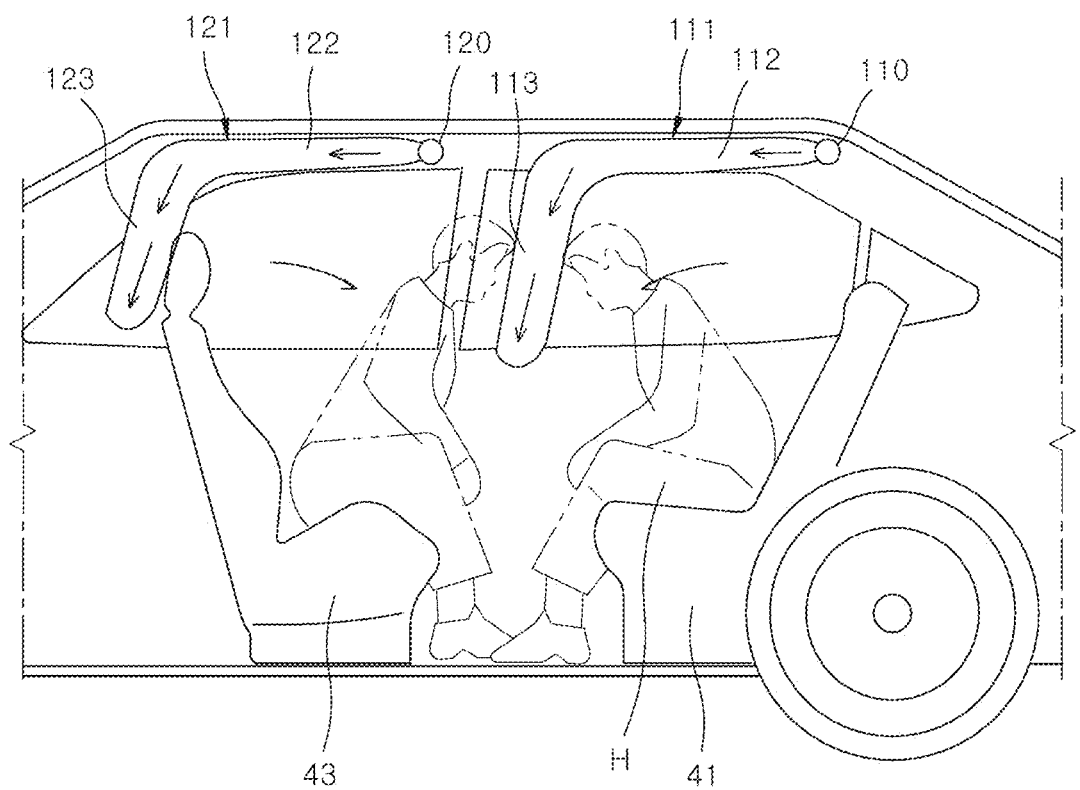
FIG. 7 illustrates that the heads of the passengers in the front and rear seats are moved toward the rear cushion in the vehicle including the rooftop airbag apparatus in accordance with the embodiment of the present invention.
Figure 8:
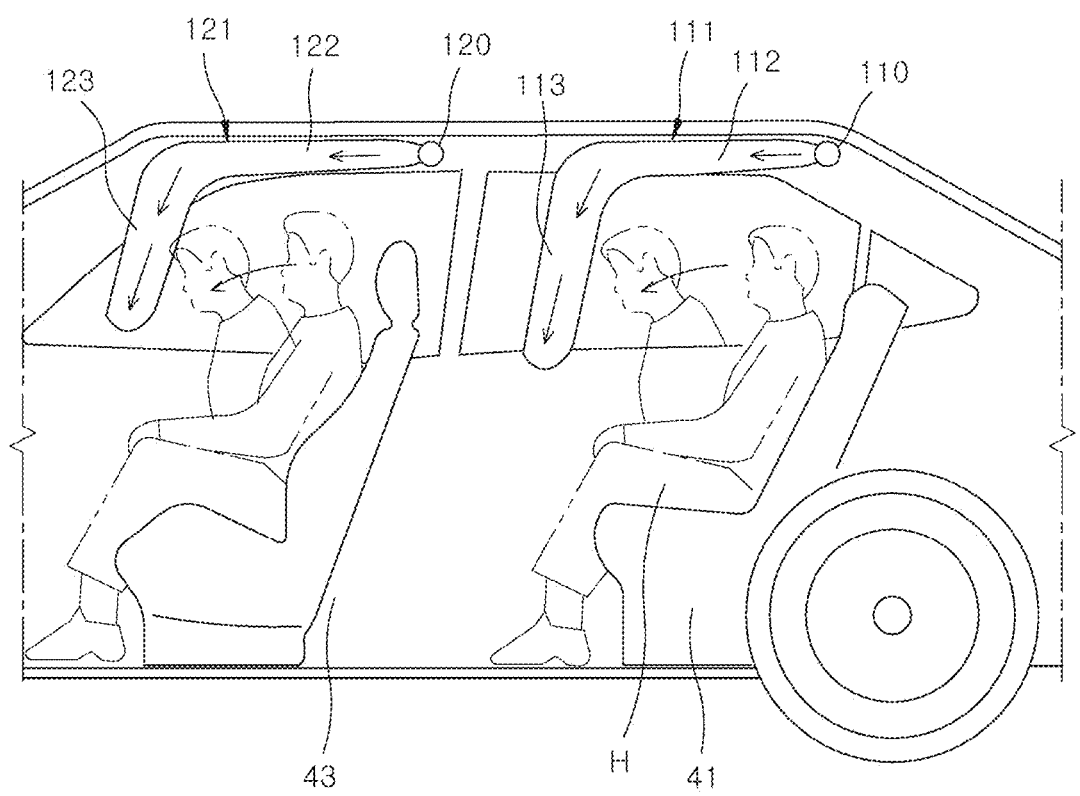
FIG. 8 illustrates that the head of the passenger in the front seat is moved toward the front cushion and the head of the passenger in the rear seat is moved toward the rear cushion, in the vehicle including the rooftop airbag apparatus in accordance with the embodiment of the present invention.

FIG. 6 illustrates that passengers are seated in front and rear seats so as to face each other in a vehicle including the rooftop airbag apparatus in accordance with the embodiment of the present invention, FIG. 7 illustrates that the heads of the passengers in the front and rear seats are moved toward the rear cushion in the vehicle including the rooftop airbag apparatus in accordance with the embodiment of the present invention, and FIG. 8 illustrates that the head of the passenger in the front seat is moved toward the front cushion and the head of the passenger in the rear seat is moved toward the rear cushion, in the vehicle including the rooftop airbag apparatus in accordance with the embodiment of the present invention.

Referring to FIGS. 6 to 8, the front seat 43 may be turned to the rear such that a passenger H is seated in the rear seat 41, and another passenger H may be seated in the rear seat 41. At this time, the passengers H of the front and rear seats 43 and 41 may be seated facing each other.

When both of the rear inflator 110 and the front inflator 120 are all driven in case of a collision of the vehicle, the rear cushion 111 may be deployed forward. Since the rear tether 115 pulls the second rear cushion part 113 toward the first rear cushion part 112 when the rear cushion 111 is deployed, the second rear cushion part 113 may be deployed while bent downward. Furthermore, since the front tether 125 pulls the second front cushion part 123 toward the first front cushion part 122 when the front cushion 121 is deployed, the second front cushion part 123 may be deployed while bent downward.

The second rear cushion part 113 may be disposed between the head of the passenger H in the rear seat 41 and the head of the passenger H in the front seat 43. In case of a collision of the vehicle, the head of the passenger H in the rear seat 41 may be moved forward, and the head of the passenger H in the front seat 43 may be moved rearward. At this time, since the head of the passenger H in the front seat and the head of the passenger H in the rear seat are buffered by the second rear cushion part 113, the second rear cushion part 113 may prevent the heads of the passengers H from directly colliding with each other. Therefore, it is possible to significantly reduce the possibility that the passengers H will get injured.

In case of a rollover of the vehicle, the first rear cushion part 112 may prevent the passenger H of the rear seat 41 from being thrown out of the vehicle, and the first front cushion part 122 may prevent the passenger H of the front seat 43 from being thrown out of the vehicle.

The passenger H at the front may be seated in the front seat 43 so as to face the front of the vehicle, and the passenger H at the rear may be seated in the rear seat 41 so as to face the front of the vehicle. At this time, the passengers H seated in the front and rear seats 43 and 41 may face the front of the vehicle.

When both of the rear inflator 110 and the front inflator 120 are all driven in case of a collision of the vehicle, the rear cushion 111 and the front cushion 121 may be deployed at the same time.

The second rear cushion part 113 and the second front cushion part 123 may be disposed in front of the heads of the passengers H, respectively. In case of a collision of the vehicle, the head of the passenger H in the rear seat 41 may be moved forward and buffered by the second rear cushion part 113, and the head of the passenger H in the front seat 43 may be moved forward and buffered by the second front cushion part 123. Therefore, the heads of the passengers H of the front and rear seats 43 and 41 may be protected.

In case of a rollover, the first rear cushion part 112 may prevent the passenger H of the rear seat 41 from being thrown out of the vehicle, and the first front cushion part 122 may prevent the passenger H of the front seat 43 from being thrown out of the vehicle.

When the rear cushion 111 is deployed, the front side of the rear cushion 111 may be pulled by the rear tether 115 and thus bent downward. Therefore, in case of a collision of the vehicle, the head of the passenger H seated in the rear seat 41 may be buffered by the bent portion of the rear cushion 111.

When the passenger H of the front seat 43 is seated facing the passenger of the rear seat 41, the bent portion of the rear cushion 111 may protrude downward between the front seat 43 and the rear seat 41. Therefore, the bent portion of the rear cushion 111 may prevent a collision between the heads of the passengers H seated in the front seat 43 and the rear seat 41. Furthermore, in case of a rollover of the vehicle, the rear cushion 111 may prevent the passenger H from being thrown out of the vehicle.

When the front cushion 121 is deployed, the front side of the front cushion 121 may be pulled by the front tether 125 and thus bent downward. Therefore, in case of a collision of the vehicle, the head of the passenger H seated in the front seat 43 may be buffered by the bent portion of the front cushion 121. Furthermore, in case of a rollover of the vehicle, the front cushion 121 may prevent the passenger H of the front seat 43 from being thrown out of the vehicle.

Since the front cushion 121 protects the head of the passenger H seated in the front seat 43, the installation of a driver seat airbag (not illustrated) and a passenger seat airbag (not illustrated) may be omitted, or the sizes of the driver seat airbag and the passenger seat airbag may be reduced. Thus, the weight of the vehicle can be reduced, and the assembly process of the vehicle can be simplified.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A rooftop airbag apparatus of a vehicle, the rooftop airbag apparatus comprising:
    a rear cushion installed between a ceiling of the vehicle and a rear seat of the vehicle, the rear cushion being connected to a rear inflator, and configured to expand and deploy toward a front seat of the vehicle and away from the rear seat as gas is injected into the rear cushion from the rear inflator, wherein the rear inflator is disposed between the rear cushion and a rear end of the vehicle; and
    a first rear tether connected to a first side of a first rear cushion part and a first side of a second rear cushion part; and
    a second rear tether connected to a second side of the first rear cushion part opposite the first side of the first rear cushion part in a width direction and a second side of the second rear cushion part opposite the first side of the second rear cushion part in the width direction,
    wherein the first rear tether and the second rear tether are configured to bend a front end of the rear cushion away from the ceiling and toward the rear seat at a prescribed angle when the rear cushion is deployed, the front end being on an opposite side of the rear cushion from the rear inflator,
    wherein a front cushion comprises:
    a first front cushion part configured to expand and deploy parallel to the ceiling of the vehicle and between the ceiling and the front seat; and
    a second front cushion part configured to be pulled by a first front tether and a second front tether so as to be bent away from the ceiling at a leading end of the first front cushion part, the leading end of the first front cushion part being disposed at an opposite side of the first front cushion part from a front inflator.

2. The rooftop airbag apparatus of claim 1, wherein the rear cushion comprises:
    the first rear cushion part configured to expand and deploy parallel to the ceiling of the vehicle and between the ceiling and the rear seat; and
    the second rear cushion part configured to be pulled by the first and the second rear tethers so as to be bent away from the ceiling at a leading end of the first rear cushion part, the leading end being disposed at all opposite side of the first rear cushion part from the rear inflator.

3. The rooftop airbag apparatus of claim 2, wherein a plurality of rear inactive areas are formed between the first and the second rear cushion parts.

4. The rooftop airbag apparatus of claim 3, wherein the plurality of rear inactive areas are formed in the width direction of the rear cushion, and
    a rear passage is formed between the rear inactive areas such that gas passes through the rear passage.

5. The rooftop airbag apparatus of claim 1, wherein the first front tether is connected to a first side of the first front cushion part and a first side of the second front cushion part, and the second front tether is connected to a second side of the first front cushion part opposite to the first side of the first front cushion part in the width direction and a second side of the second front cushion part opposite to the first side of the second front cushion part in the width direction.

6. The rooftop airbag apparatus of claim 1, wherein a plurality of front inactive areas are formed between the first and the second front cushion parts.

7. The rooftop airbag apparatus of claim 6, wherein the plurality of front inactive areas are formed in the width direction of the front cushion, and
a front passage is formed between the front inactive areas such that gas passes through the front passage.

8. A rooftop airbag apparatus of a vehicle, the rooftop airbag apparatus comprising:
a rear cushion installed between a ceiling of the vehicle and a rear seat of the vehicle, the rear cushion being connected to a rear inflator, and configured to expand and deploy toward a front seat of the vehicle and away from the rear seat as gas is injected into the rear cushion from the rear inflator, wherein the rear inflator is disposed between the rear cushion and a rear end of the vehicle;
a first rear tether and a second rear tether configured to bend a front end of the rear cushion away from the ceiling and toward the rear seat at a prescribed angle when the rear cushion is deployed, the front end being on an opposite side of the rear cushion from the rear inflator;
a front cushion installed between the ceiling and the front seat, the front cushion being connected to a front inflator, and configured to expand and deploy toward a front end of the vehicle and away from the front and the rear seats as gas is injected into the front cushion from the front inflator; and
a first front tether and a second front tether each connected to the front cushion and configured to bend a front end of the front cushion away from the ceiling and toward the front seat at a prescribed angle when the front cushion is deployed, the front end of the front cushion being on an opposite side of the front cushion from the front inflator.

9. The rooftop airbag apparatus of claim 8, wherein the rear cushion comprises:
a first rear cushion part configured to expand and deploy parallel to the ceiling of the vehicle and between the ceiling and the rear seat; and
a second rear cushion part configured to be pulled by the first and the second rear tethers so as to be bent away from the ceiling at a leading end of the first rear cushion part, the leading end being disposed at an opposite side of the first rear cushion part from the rear inflator.

10. The rooftop airbag apparatus of claim 9, wherein the first rear tether is connected to a first side of the first rear cushion part and a first side of the second rear cushion part, and the second rear tether is connected to a second side of the first rear cushion part opposite to the first side of the first rear cushion part in a width direction and a second side of the second rear cushion part opposite to the first side of the second rear cushion part in the width direction.

11. The rooftop airbag apparatus of claim 9, wherein a plurality of rear inactive areas are formed between the first and the second rear cushion parts.

12. The rooftop airbag apparatus of claim 11, wherein the plurality of rear inactive areas are formed in the width direction of the rear cushion, and
a rear passage is formed between the rear inactive areas such that gas passes through the rear passage.

13. The rooftop airbag apparatus of claim 8, wherein the front cushion comprises:
a first front cushion part configured to expand and deploy parallel to the ceiling of the vehicle and between the ceiling and the front seat; and
a second front cushion part configured to be pulled by the first and the second front tethers so as to be bent away from the ceiling at a leading end of the first front cushion part, the leading end of the first front cushion part being disposed at an opposite side of the first front cushion part from the front inflator.

14. The rooftop airbag apparatus of claim 13, wherein the first front tether is connected to a first side of the first front cushion part and a first side of the second front cushion part, and the second front tether is connected to a second side of the first front cushion part opposite to the first side of the first front cushion part in the width direction and a second side of the second front cushion part opposite to the first side of the second front cushion part in the width direction.

15. The rooftop airbag apparatus of claim 13, wherein a plurality of front inactive areas are formed between the first and the second front cushion parts.

* * * * *